(12) United States Patent
Elsey

(10) Patent No.: US 11,511,482 B2
(45) Date of Patent: *Nov. 29, 2022

(54) APPARATUS AND METHOD FOR MAKING AN OBJECT

(71) Applicant: Zydex Pty Ltd, Alexandria (AU)

(72) Inventor: Justin Elsey, Alexandria (AU)

(*) Notice: Subject to any disclaimer, the term of this patent is extended or adjusted under 35 U.S.C. 154(b) by 0 days.

This patent is subject to a terminal disclaimer.

(21) Appl. No.: 17/098,490

(22) Filed: Nov. 16, 2020

(65) Prior Publication Data

US 2021/0060853 A1  Mar. 4, 2021

Related U.S. Application Data

(60) Continuation of application No. 15/646,114, filed on Jul. 11, 2017, now Pat. No. 10,836,101, which is a
(Continued)

(30) Foreign Application Priority Data

Aug. 20, 2011 (AU) .............................. 2011903328
Jan. 12, 2012 (AU) .............................. 2012200164

(51) Int. Cl.
| | |
|---|---|
| B29C 64/124 | (2017.01) |
| B33Y 10/00 | (2015.01) |
| B29C 64/245 | (2017.01) |
| B29C 64/147 | (2017.01) |
| B29C 64/214 | (2017.01) |
| B33Y 30/00 | (2015.01) |

(52) U.S. Cl.
CPC .......... *B29C 64/124* (2017.08); *B29C 64/147* (2017.08); *B29C 64/214* (2017.08); *B29C 64/245* (2017.08); *B33Y 10/00* (2014.12); *B33Y 30/00* (2014.12)

(58) Field of Classification Search
CPC ..... B29C 64/147; B29C 64/20; B29C 64/124; B33Y 30/00; B33Y 10/00
See application file for complete search history.

(56) References Cited

U.S. PATENT DOCUMENTS

| | | |
|---|---|---|
| 5,171,490 A | 12/1992 | Fudim |
| 5,192,559 A | 3/1993 | Hull |
| (Continued) | | |

FOREIGN PATENT DOCUMENTS

| | | |
|---|---|---|
| JP | 04-341826 A | 11/1992 |
| WO | WO 2010/074566 A1 | 7/2010 |

OTHER PUBLICATIONS

International Search Report and Written Opinion dated Oct. 2, 2012 in related International Application No. PCT/US2012/000972.

*Primary Examiner* — Joseph S Del Sole
*Assistant Examiner* — Mohamed K Ahmed Ali
(74) *Attorney, Agent, or Firm* — Eric Lane; Green Patent Law

(57) ABSTRACT

A method for making an object and an apparatus for making the object in accordance with the method is disclosed. A section of the object is formed by irradiating a layer of material with a radiation, the layer of material being disposed on a material receiving surface of a flexible element shaped by a shaping member contacting the flexible element. The radiation passes through the member and the flexible element. The member is tilted to induce a peeling separation of the member from the element.

9 Claims, 10 Drawing Sheets

Related U.S. Application Data division of application No. 14/239,607, filed as application No. PCT/AU2012/000972 on Aug. 17, 2012, now Pat. No. 9,802,361.

(56) References Cited

U.S. PATENT DOCUMENTS

| | | |
|---|---|---|
| 5,447,822 A | 9/1995 | Hull et al. |
| 7,906,061 B2 | 3/2011 | Partanen |
| 2002/0153640 A1 | 10/2002 | John |
| 2005/0248061 A1 | 11/2005 | Shkolnik et al. |
| 2008/0113293 A1 | 5/2008 | Shkolnik et al. |
| 2008/0174050 A1 | 7/2008 | Kikuchi |
| 2009/0020901 A1* | 1/2009 | Schillen ............... B29C 64/153 264/31 |

* cited by examiner

APPARATUS AND METHOD FOR MAKING AN OBJECT

CROSS-REFERENCE TO RELATED APPLICATIONS

This application claims priority to and is a continuation of U.S. application Ser. No. 15/646,114, filed Jul. 11, 2017, which issued as U.S. Pat. No. 9,802,361 on Oct. 31, 2017, which is a divisional of U.S. application Ser. No. 14/239,607, filed Feb. 19, 2014, which claims priority to and benefit of and is a U.S. national stage entry of International Application No. PCT/AU2012/000972, filed Aug. 17, 2012, which claims priority to Australian Application No. 2012200164, filed Jan. 12, 2012 and Australian Application No. 2011903328, filed Aug. 20, 2011 each of which is hereby incorporated by reference in its entirety.

FIELD

The present invention generally relates to an apparatus for making an object and a method for making an object.

BACKGROUND

A three-dimensional object can be built up one section at a time. A layer of material is solidified in the shape of a section through the object. Once the section is formed, another is formed in contact with the previously formed section. Repetition of this process allows multi-laminate objects to be fabricated. This is the basis of techniques such as rapid prototyping.

SUMMARY

According to a first aspect of the invention, there is provided a method for making an object, the method comprising the steps of:

forming a section of the object by irradiating a material with a radiation, the material being disposed on a material receiving surface of a flexible element, the shape of the flexible element being affected by contact between a shaping member and the flexible element; and tilting at least one of the shaping member and the flexible element to induce a peeling separation of the shaping member from the flexible element.

In an embodiment, the radiation passes through the shaping member and the flexible element.

In the context of this specification, an object is a tangible object. It may, for example, be rigid or resilient. It may have one or more hollows or voids, such as that of a cup or tennis ball, for example. Example objects that may be made include but are not limited to jewelry, dental restorations, enclosures for handheld devices and power tools, hearing aid shells, a sculpture such as a life size reproduction of a person, and a vehicle dashboard.

In the context of this specification, a section is to be understood to encompass a slice of the object. A planar section is to be understood to encompass a portion of the object located between two parallel planes that intersect the object. Generally, but not necessarily, the sections of the object formed are planar sections.

In an embodiment, the material may be in contact with the object being made during the step of forming the section. The section may be formed fixed to the object being made. The section may be formed fixed to the material receiving surface and subsequently separated. Consequently, the step of joining a section formed separate of the object being made to the object being made may be avoided. Joining a separately formed section may require precision alignment and regular apparatus calibration.

In an embodiment, the material comprises a layer of material. The object may be fabricated by sequentially irradiating each of a plurality of material layers to form respective sections.

In an embodiment, the material is a liquid. In alternative embodiments, the material may comprise a powder such as a fluidized polymer powder, or a fluid or paste.

Tilting at least one of the shaping member and the flexible element to induce peeling separation of the shaping member from the flexible element may reduce forces exerted on the object being made compared to pulling the element and the member apart. Separation is initiated at an edge of the contacting area of the shaping member and flexible element rather than the entire area. Less force needs to be applied in the first than in the second case in which a force exerted by atmospheric pressure over the entire contacting area must be overcome. Once the surface that receives the shaping member is exposed to atmosphere, the flexible element may distort freely which in turn facilitates peeling of the section from the flexible element. If the shaping member was to remain received by the flexible element a relatively extreme separation force (resulting from atmospheric pressure) may be required to separate the section from the flexible element. The extreme force may be transferred to the object being made during separation and damage it.

Delicate objects, for example filigree jewelry, may thus be made by an embodiment that may not be made using another approach.

In an embodiment, during the step of forming a section the material receiving surface is upwardly facing, and the member contacts a downwardly facing surface of the flexible element directly beneath the object being made to prevent the upwardly facing surface sagging. The flexible element may sag by the force of gravity. Sagging is undesirable because a surface of a section formed adjacent the surface will deviate from the desired form causing fabrication of a malformed object.

A relatively modest volume of material, for example 0.01 ml to 500 ml of a liquid, may be required to form, on the upwardly facing surface of the flexible element, a section. If the liquid material was alternatively disposed under the flexible element in a vat, for example, a relatively large volume of liquid—for example, of the order of 10 L—may be required. This may be far in excess of the volume of the object, in which case the liquid may only be slowly consumed over an extended period in which several objects are made, and during which the liquid may become contaminated or otherwise degraded. A typical cost for liquid used in the production of the object may be of the order of several hundred dollars per litre, and thus costly waste may be reduced by disposing the material over an upwardly facing surface. A further advantage of employing an upward facing surface is that a surface level of the liquid does not need to be controlled, whereas an apparatus having a liquid disposed in a vat under the flexible element generally requires the surface level to be maintained while the object is being made. This may, for example, require material overflow management if a part of the apparatus (such as a drive shaft) moves into the liquid.

In an embodiment, prior to the step of forming the section is a step of tilting at least one of the shaping member and the flexible element so that they contact to shape the flexible element. This may expel some of the material located between the element and the object being made. The shape of the material receiving surface may be defined by the shaping member, and the material receiving surface. The tilting action may flatten the element.

Generally, but not necessarily, the shaping of the flexible element flattens the material receiving surface. A flat material receiving surface may be required to form a planar section. If deviation from a flat form is not corrected the sections may not have the desired geometry. The shaping of the layer of material, by shaping the material receiving surface, may be achieved without potentially complex and fussy steps such as machining or cutting the material.

In an embodiment, the method comprises the step of separating the object being made and the material receiving surface. This may induce a peeling separation of the object being made and the material receiving surface. The step of separating may comprise the step of moving the object being made away from the flexible element and the member. The forces experienced by a section adhered to the surface during peeling separation from the surface is typically much less than the force generated when separating the section from the surface in other ways. Consequently, the use of a flexible element may reduce the risk of damage to the section and/or the object being made.

Moving the object being made from the flexible element and the member may reduce or eliminate the need to handle the flexible element or to have things contacting it which can cause the element to crease, wear or damage. It may also reduce or eliminate the need to have mechanisms in contact with the upwardly facing surface of the element which may interfere with the distribution of the liquid on the sheet.

In an embodiment, during the step of separating the object being made and the material receiving surface, the flexible element is displaced together with the member which is pressed to the flexible element by atmospheric pressure. The displacement of the member is constrained such that the member is caused to tilt.

In an embodiment, the method comprises the step of decreasing the separation of the object being made and the material receiving surface in preparation to form a subsequent section of the object.

For example, the object being made may be brought to within one section thickness of the nominal position of the material receiving surface. Reducing the separation of the object being made and the material receiving surface may press the material which in turn presses on the surface to cause it to be pushed downwardly. This may cause the upwardly facing surface to become concave, rather than flat.

In an embodiment, the step of forming a section may complete an entire section of the object being made. Each entire section may comprise an entire planar section.

The object being made and the material receiving surface may be separated after the formation of an entire section of the object being made. This may aid in the fabrication of overhanging features of the object with fewer, or without any, supporting scaffolds. Example overhanging features include the arms of a "T" shaped object. The fabrication of overhangs may be problematic for some methods that do not form an entire section before separation.

According to a second aspect of the invention, there is provided an apparatus for making an object, the apparatus comprising:
 a flexible element having a material receiving surface for receiving a material from which the object is made; and
 a shaping member that is arranged to contact the flexible element, the shape of the flexible element being affected when the shaping member contacts the flexible element, at least one of the shaping member and the flexible element can be tilted to induce a peeling separation of the shaping member from the flexible element.

In an embodiment, the apparatus is configured such that in use the material receiving surface is upwardly facing and the shaping member contacts a downwardly facing surface of the flexible element directly beneath the object being made to prevent the flexible element sagging. The apparatus may, for example, have a chassis with attached feet configured to support the chassis above a surface such as a bench, and the flexible member is mounted relative to the chassis so that when the chassis is so supported the surfaces have a horizontal orientation.

In an embodiment, at least one of the shaping member and the flexible element can be tilted into contact with the other. This may expel at least some material, when so received, located between the flexible element and the object being made.

In an embodiment, the shaping member is a flexible element flattening member. The shaping member may comprise a planar surface that can contact the flexible element.

In an embodiment, the apparatus comprises a positioner configured to alter the separation of the object being made and the material receiving surface.

In an embodiment, the separation of the object being made and the material receiving surface can be increased. This may induce a peeling separation of the object being made and the material receiving surface.

In an embodiment, the flexible element may be moved with the shaping member pressed thereto by atmospheric pressure. A constraint may constrain the movement of the member such that the member is caused to tilt. The constraint may comprise a pivot, for example a hinge or pin.

In an embodiment, the separation of the object being made and the material receiving surface can be decreased in preparation for the forming of a further section of the object.

In an embodiment, the apparatus comprises a radiation source arranged to irradiate the material so received to form a section of the object. The radiation source may be arranged to irradiate the material so received when the object being made is in contact with the material. The radiation source may be arranged to irradiate the material when so received through the member and the flexible element.

In an embodiment, the apparatus comprises a radiation manipulator configured to manipulate radiation generated by the source. The radiation manipulator may impart a spatial feature to the radiation. The radiation manipulator may impart a temporal feature to the radiation. The radiation manipulator may be configured to scan the radiation relative to the material receiving surface. The shape of each section may thus be individually determined by the action of the radiation manipulator on the radiation.

In an embodiment, the apparatus is configured such that the flexible element forms at least part of a vessel configured to contain the material. The vessel may be a trough. The vessel may be a dish. The vessel may be of any suitable configuration. The vessel may prevent the material from falling off or flowing off the element. This may reduce costly material consumption.

In an embodiment, the flexible element comprises a flexible sheet. The flexible sheet may have a unitary construction. For example, the flexible sheet may not be backed by another element. The flexible sheet may be, for example, a membrane. Alternatively, the sheet may be a composite. The flexible element may have a Young's modulus of between 100 and 5000 MPa. The Young's modulus may be between 100 and 1000 MPa. The Young's modulus may be between 400 and 700 MPa. The Young's modulus may be around 560 MPa.

In an embodiment, the apparatus comprises a flexible element tensioner. The tensioner may comprise a flexible element contacting component in contact with the flexible element. The contacting component may be in contact with the downwardly facing surface of the flexible element. The tensioner may comprise one or more biasing elements that bias the flexible element-contacting component towards the downwardly facing surface. The element-contacting component may comprise a ring. The one or more biasing elements may comprise a spring arrangement. The arrangement may comprise an extension spring operationally coupled to the element and the component. Alternatively or additionally, the downwardly facing surface may be biased into the frame by gravity.

In an embodiment, the apparatus comprises a controller. The controller may be configured to receive instructions for making the object. The controller may be configured to receive the instructions in the form of data indicative of the plurality of sections to be formed sequentially by the device. The sections may be individually determined. Each individually determined section may differ from another of the sections by, for example, the shape of their respective boundaries. Not every section needs to be different, however. The controller may be configured to coordinate movement of the member, the radiation source, the positioner, and in some embodiments other parts, such that the plurality of sections are formed sequentially in accordance with the received instructions. The controller may be configured to execute the steps of a method in accordance with the first aspect of the invention. The controller may comprise a processor.

Were possible, any one or more features of the first aspect of the invention may be combined with any one or more features of the second aspect of the invention.

According to a third aspect of the invention, there is provided a method for making an object, the method comprising the steps of:

on a material receiving surface of a flexible element, disposing a material used to make the object; and causing relative movement between a shaping member and the flexible element, wherein during the relative movement the shaping member affects the shape of the flexible element.

Were possible, any one or more features of the third aspect of the invention may be combined with any one or more features of the first and second aspects of the invention.

According to a fourth aspect of the invention, there is provided an apparatus for making an object, the apparatus comprising:

a flexible element having a material receiving surface for disposing thereon a material used to make the object; and a shaping member that is arranged to contact the flexible element to affect the shape of the flexible element.

Were possible, any one or more features of the fourth aspect of the invention may be combined with any one or more features of the first and second aspects of the invention.

Any liquid used to make an object referred to in this specification may, as appropriate, be replaceable with any suitable material or fluid used to make an object, and vice versa.

BRIEF DESCRIPTION OF THE FIGURES

In order to achieve a better understanding of the nature of the present invention, embodiments of the invention will now be described, by way of example only, with reference to the accompanying figures in which.

DETAILED DESCRIPTION

Figure 1:
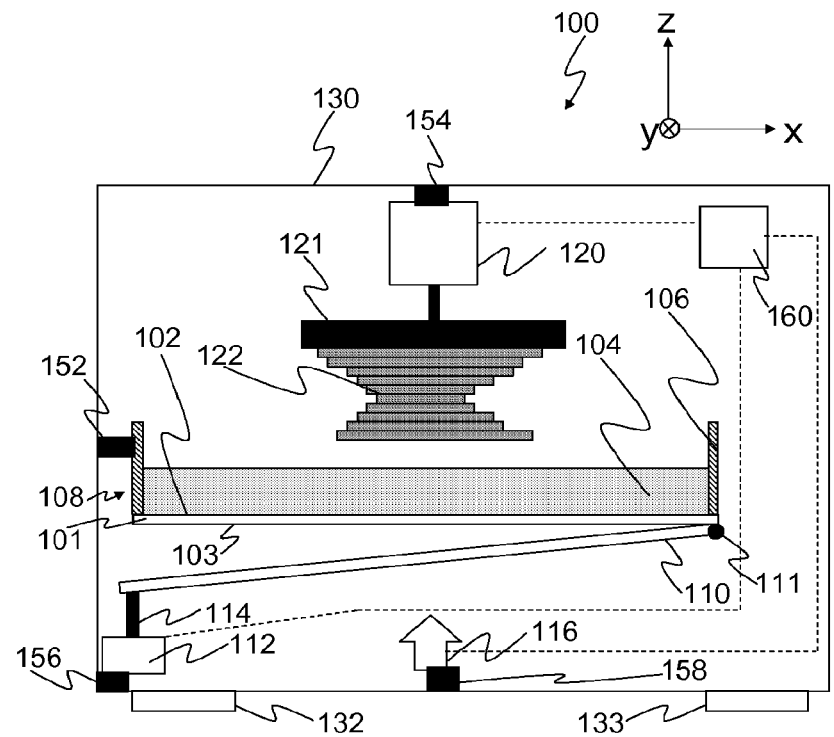
FIGS. 1 to 9 show schematic elevation views of one embodiment of an apparatus for making an object during various stages of its use.

FIGS. 1 to 9 show schematic views of one embodiment of an apparatus for making an object, the apparatus being generally indicated by the numeral 100. The figures taken in sequence are indicative of one embodiment of a method for making an object.

Coordinate axes are shown in the figures where x and y are horizontally orientated and z is vertically orientated.

The apparatus 100 has a flexible element in the form of a substantially transparent sheet 101. The flexible element has a material receiving surface 102 over which a material, for example a photohardenable liquid 104, is disposed.

A photohardenable liquid (or photocurable liquid) is a liquid that hardens when exposed to a radiation such as visible or invisible light (ultraviolet light, for example). Example wavelengths of suitable light include 355 nm and 405 nm. In some embodiments, radiation other than light may be used. For example, the radiation may be ionizing or non-ionizing radiation.

The photohardenable liquid may comprise a mixture of acrylate monomers and oligomers, photoinitiators, colourants and stabilizers such that the mixture polymerizes when exposed to suitable light. Example liquids include Somos NEXT from DSM Somos, USA, and KZ-1860-CL from Allied PhotoPolymers, USA.

Sheet 101 may possess anti-stick properties in relation to the photohardenable material 104 when it is cured in contact with the sheet. Suitable materials for sheet 101 include FEP fluoropolymer film from Du Pont, USA. The film may be of around 125 micrometers thickness, but may be thicker or thinner as appropriate. FEP fluoropolymer is flexible but not particularly elastic, having a Young's modulus of 560 MPa. Generally, but not necessarily, a Young's modulus of between 100 and 1000 MPa may be suitable. In some circumstances, a Young's modulus of between 400 MPa and 700 MPa is suitable. In some circumstances, a Young's modulus less than 5 GPa may be suitable. Other examples of a suitable materials include but are not limited to PFA fluoropolymer film, also from Du Pont, USA, nylon film and mylar film. Generally, any suitable material may be used for the flexible element.

In this embodiment, the sheet 101 is not backed by another material or layer, and has a unitary construction. In other embodiments, the sheet may have a multilaminate construction. For example, the sheet may comprise a layer of silicone bonded to a polyester film, the film providing a high Young's modulus and the silicone providing a superior nonstick surface. Other materials or laminates of different materials may alternatively be used.

The sheet 101 and side walls 106 form a shallow vessel in the form of a trough or dish 108 for containing the photohardenable liquid 104. The sheet 101 forms the base of the trough. The vessel may have a volume sufficient to hold enough liquid to build an entire object without being replenished. Optionally, a conduit may connect the vessel and a supply of the liquid to replenish the liquid as it is consumed. The trough 108 and contained liquid 104 may be relatively easily removed from the apparatus and replaced with another trough and liquid, thus providing a convenient means for replacing damaged troughs or in preparation to make an object from a different material. Replacement of the trough is explained with reference to FIG. 20 below.

The apparatus has a tiltable shaping member 110 that can be tilted into and out of contact with the flexible element around a pivot in the form of a hinge 111. The member when operated may assist in shaping the flexible element. A drive shaft 114 of a linear actuator 112 can exert a force on the tiltable member 110 to cause the member to tilt around the hinge 111.

The embodiment of FIGS. 1 to 9 is configured such that in use the sheet 101 is horizontally orientated. The apparatus may, for example, have a chassis 130 with attached feet 132,133 configured to support the chassis above a surface such as a bench, and the sheet 101 is mounted relative to the chassis so that when the chassis is so supported the sheet has a horizontal orientation. In other embodiments, the surface of the sheet which the liquid is disposed on may be inclined at up to 45 degrees to the horizontal (that is, the surface is upwardly facing), provided that the vessel walls are sufficiently high to contain the fluid. Mounting brackets such as 152,154,156,158 may be used to ensure that apparatus components are maintained in their correct position and orientation relative to the chassis.

In alternative embodiments, the surface may have any arbitrary orientation. In some of these embodiments; the liquid is contained within an enclosed vat. For example, the liquid may be below the element and the material receiving surface is downwardly facing.

Figure 10:
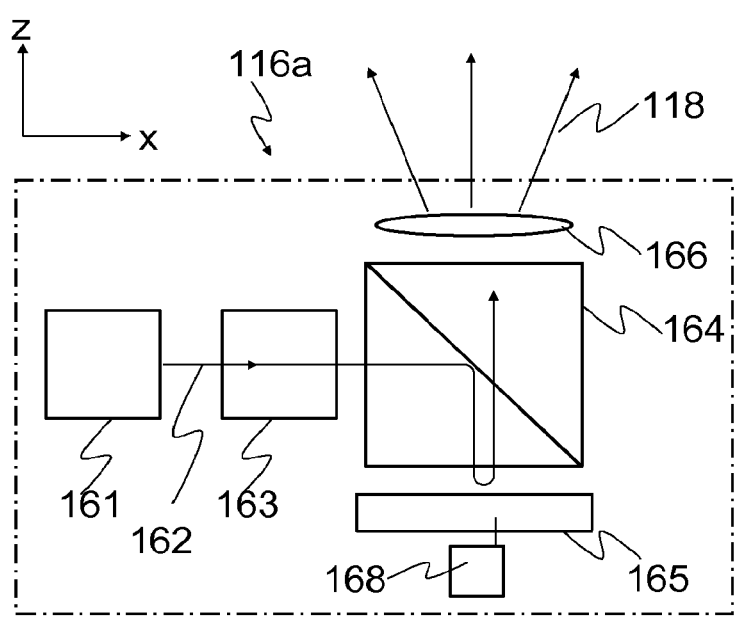
FIGS. 10 to 12 show schematic views of example radiation sources and radiation manipulators that may form part of an apparatus for making an object.

A radiation source in the form of a light source 116 can be activated so that it emits spatially and/or structured light 118 capable of selectively hardening areas of the photohardenable liquid 104. Any suitable light source may be used. An example of a light source is shown in FIG. 10 and generally indicated by the numeral 116a. Light source 116a may, for example, incorporate a light manipulator and an image projection system. Light source 116a has a light generator 161 an emitting light 162, relay optics 163, a turning prism 164, a spatial light modulator 165 controllable by controller 168, and a projection lens 166.

Figure 11:
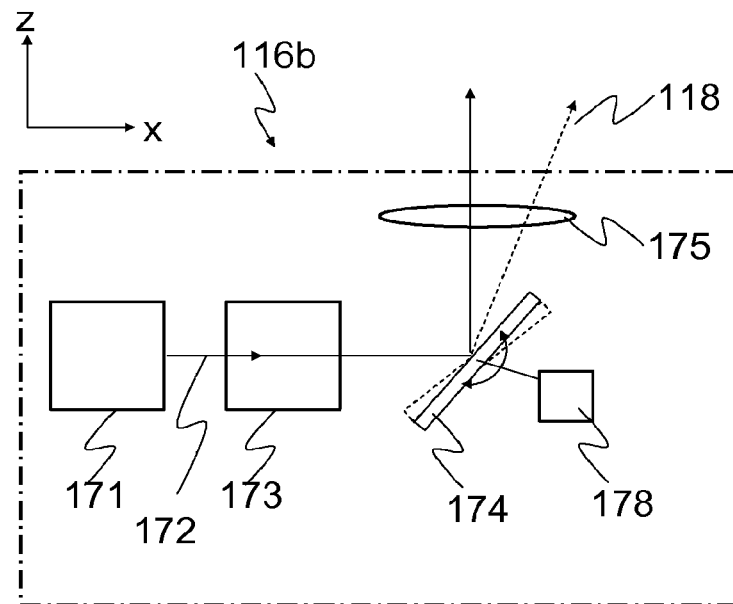

Another example of a light source is depicted in FIG. 11 and generally indicated by the numeral 116b. Light source 116b comprises a laser source 171 emitting light 172 of wavelength of around 350 nm, for example, collimating and/or focusing optics 173, scanning mirror 174 whose rotation is controllable in one or more axes by mirror controller 178, optionally a second controllable mirror not shown in the figure, and optionally a projection lens 175 such as an F-Theta lens. Mirror controller 178 can be configured to scan the mirror 174 (coordinated with a second mirror, if present) in a raster scanning mode, or alternatively in a vector scanning mode.

Figure 12:
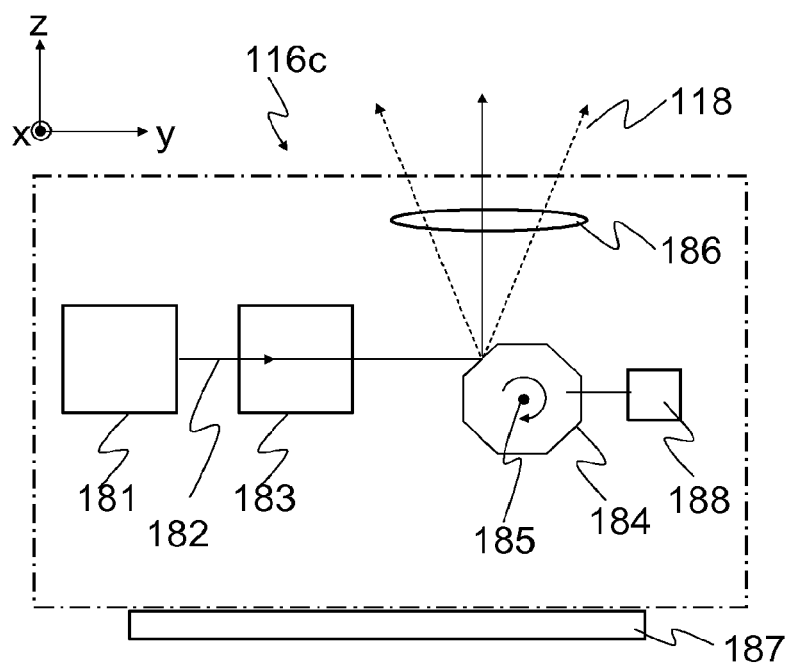

FIG. 12 shows another example of a light source generally indicated by the numeral 116c and comprising a laser source 181 emitting light 182, collimating and/or focusing optics 183, polygon mirror 184 rotatable around an axis 185 and controllable by controller 188, and optionally a projection lens 186 such as an F-Theta lens. As the light source 116c may only scan light in the y-axis according to the coordinate system shown in FIG. 12, the light source may reside on a translation stage 187 which can move the apparatus in the x-direction, enabling the projected light to address locations in the x and y dimensions. Apparatus 116c is suitable for operating in a raster scanning mode.

The light source may, in some embodiments, comprise an incandescent light or light emitting diode, for example. Any suitable light source may be used.

In some embodiments, radiation sources other than light may be used. For example, the radiation source may be ionizing or non-ionizing radiation.

Referring again to FIGS. 1 to 9 a positioner 120 capable of linear motion along the z-direction is coupled to and moves a platform 121 on which the object being made is mounted. The positioner 120 positions the object being made 122 relative to the material receiving surface 102 of the sheet 101. The positioner may comprise any one or more of linear motors, drive belts, stepper motors, rack and pinion arrangements, for example, or generally any suitable components arranged to provide linear motion.

A sequence of actions can be performed with the apparatus 100 to form a new solid section of the object 122 and non-destructively separate it from the sheet 101. The process begins as shown in FIG. 1, with the previous sections of the object under fabrication 122 distanced from the sheet 101 and the member 110 retracted from the underside of the sheet 101.

Figure 2:
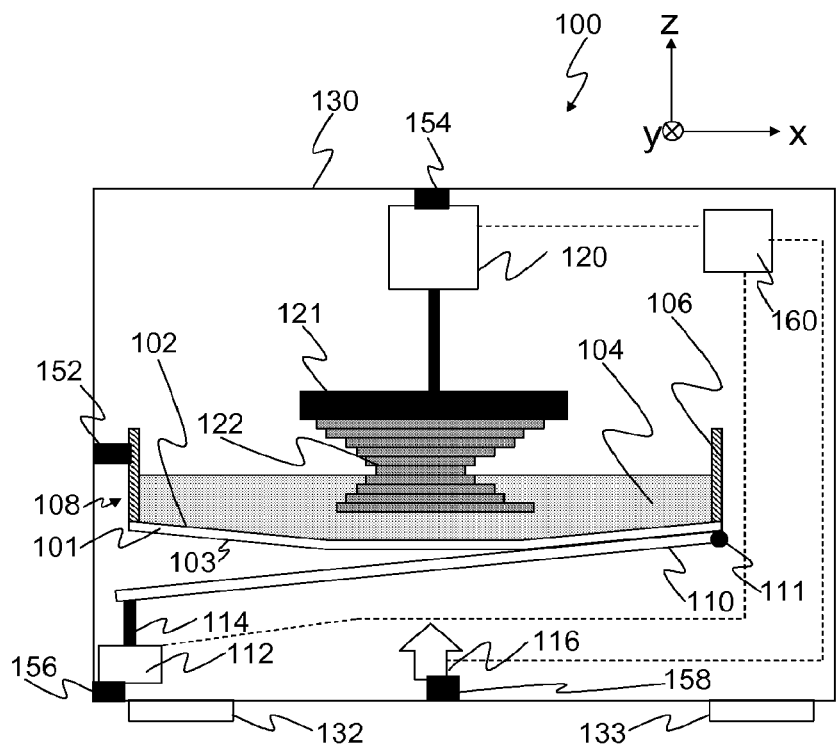

Next, as shown in FIG. 2, positioner 120 lowers the object being made 122 towards the sheet 101 to a final position which is nominally one section-thickness above the top surface 102 of the sheet 101 when flat.

The sheet 101, not being supported however, will undesirably deflect away from the object being made 122 as shown in FIG. 2, due to the fluid between them. This causes the separation of the object being made and the surface 102 to be typically many sections thick. The surface 102 also deviates from a flat form.

The thickness of one section is generally desired to be in the range of 10 microns to 250 microns, but it may be less if particularly fine fabrication resolution is required, and greater if a relatively coarse fabrication resolution is required.

Figure 3:
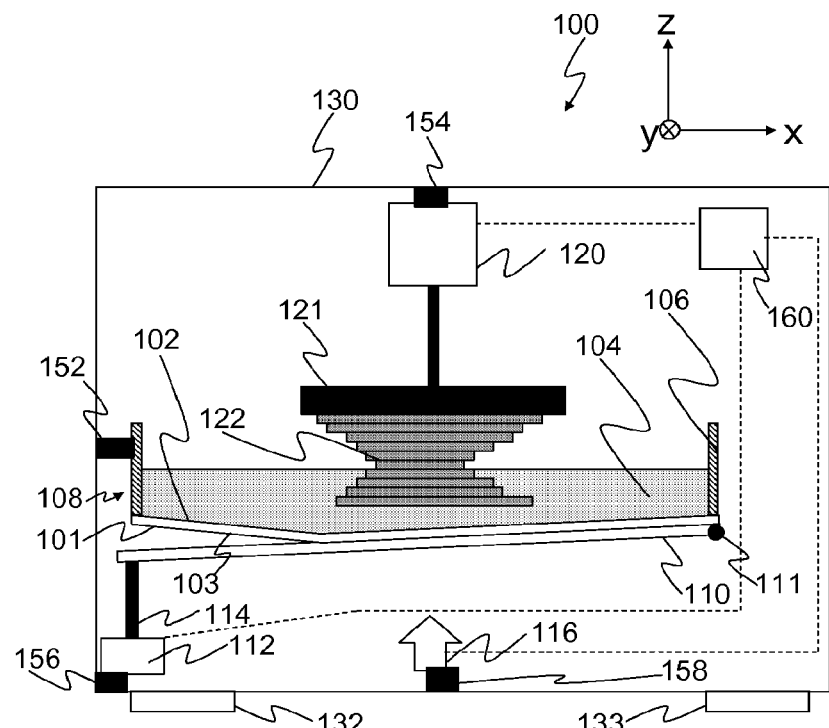
Figure 4:
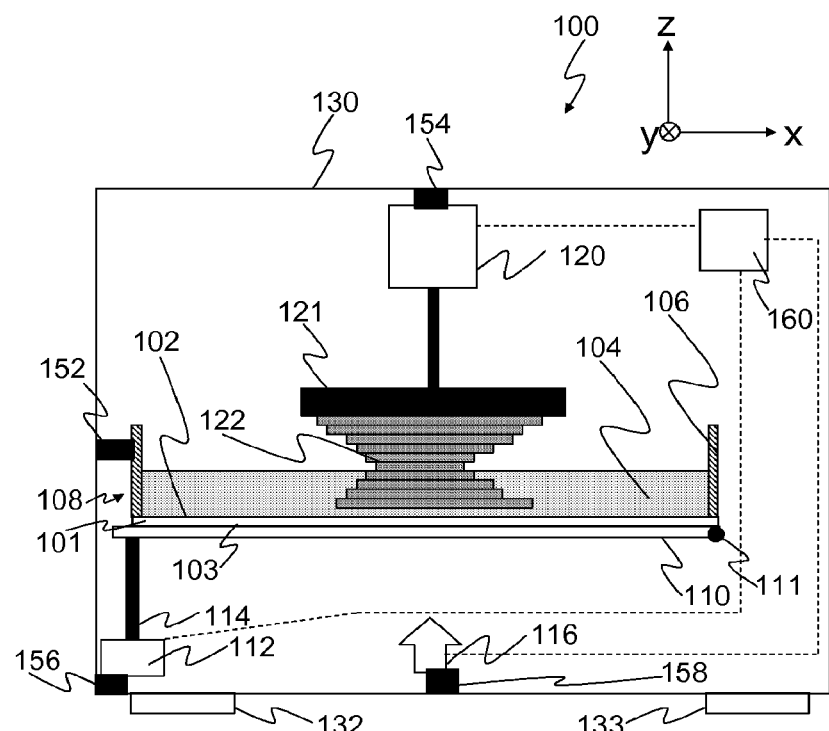

Next, as shown in FIGS. 3 and 4, mechanical actuator 112 is engaged to tilt the flexible element shaping member 110 into contact with the underside 103 of the sheet 101. This action lifts and shapes the sheet 101 to have it adopt a flat configuration or form while forcing excess photohardenable liquid 104 out of the gap between the previously hardened sections 122 and the sheet 101. The actuator may comprise any one or more of linear motors, drive belts, stepper motors, rack and pinion arrangements, for example, or generally any suitable components arranged to provide linear motion.

The figures illustrate embodiments in which it is the member that is tilted to induce separation of the member and element. In another embodiment, however, the flexible element may be tilted rather than the member. In yet another embodiment, both the flexible element and the member may be tilted. For example, an edge of the vessel 108 may be attached to a pivot and the member 110 may be fixed with respect to the chassis 130. Another actuator may be operatively coupled to the vessel to, when operated, cause the vessel to tilt around the pivot.

Figure 5:
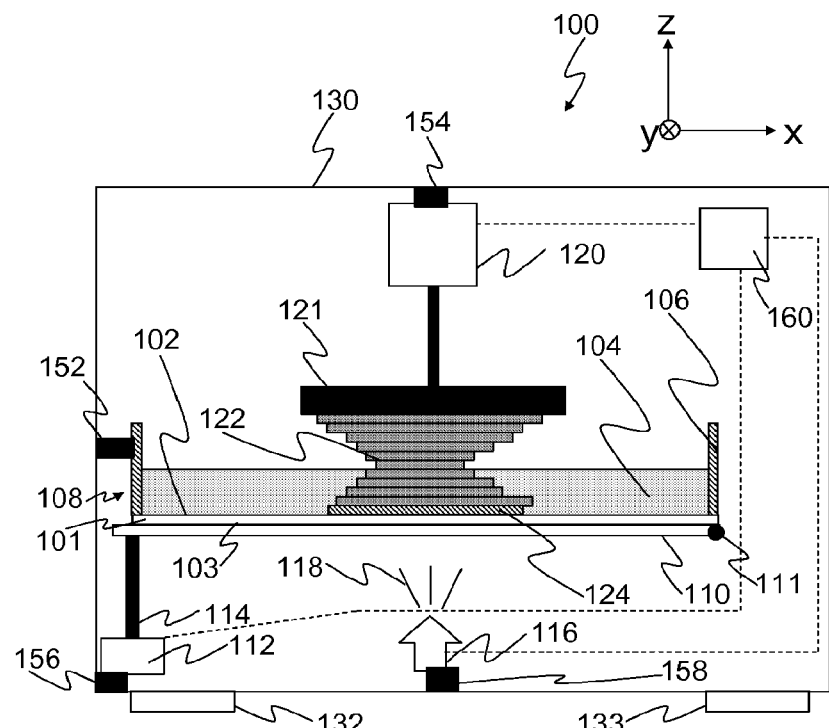

Next, as shown in FIG. 5, light 118 having spatial features in accordance with the sectional geometry of the object being made is emitted from light source 116 to selectively harden regions of the layer of photohardenable liquid 104 in contact with the previously formed sections 122 to form a new hardened section 124.

Figure 6:
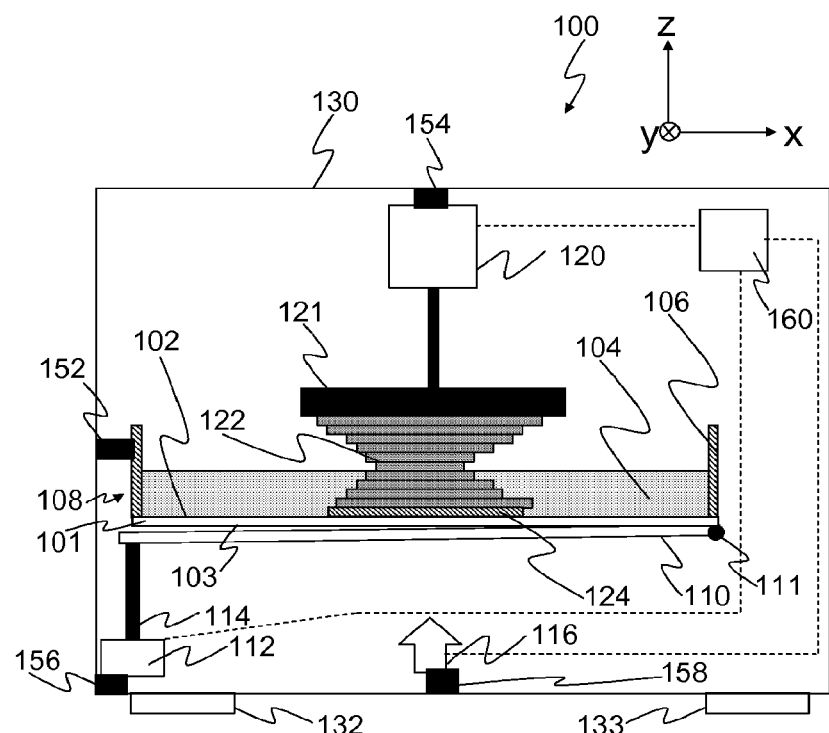

Next, as shown in FIG. 6, the member 110 is tilted away from the sheet 101 to induce a peeling separation of the member from the element. As the separation is initiated at an edge of the contacting area of the member and the sheet, the applied force only needs to be sufficient to overcome the atmospheric pressure on the edge region. Once the separation is initiated, air may enter the gap there formed, facilitating separation further along the contacting area.

In contrast, if the member and sheet were moved apart without tilting, i.e. by pulling them apart along the z-axis, the atmospheric pressured acting on the contacting area would need to be overcome. This would necessitate a larger force than peeling from an edge, and this larger force would be transferred to the object under construction, possibly damaging it.

Figure 7:
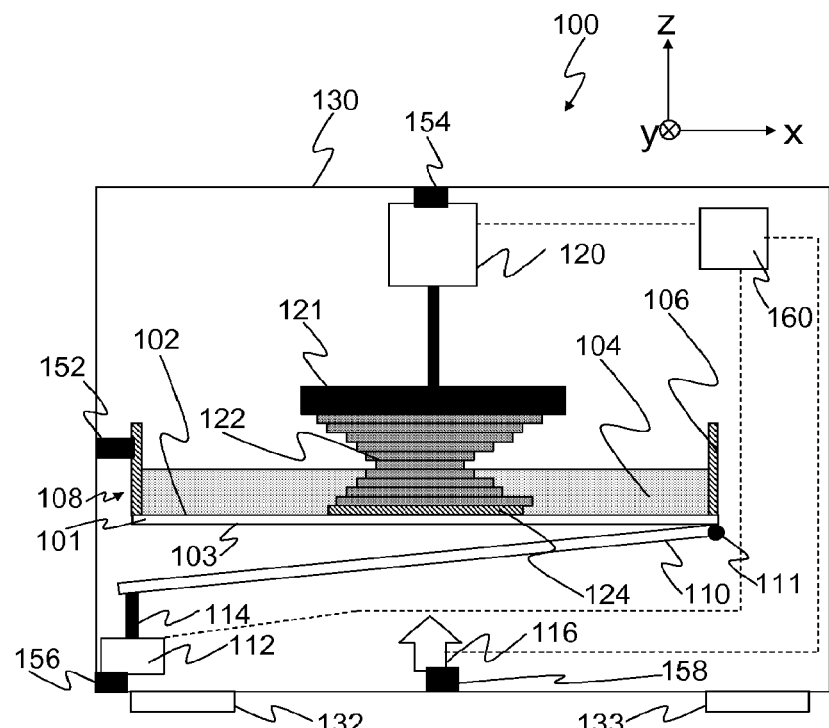

Next, as shown in FIG. 7, the member 110 continues to tilt to a position where it is fully separated from the sheet 101 beneath the object under construction.

Figure 8:
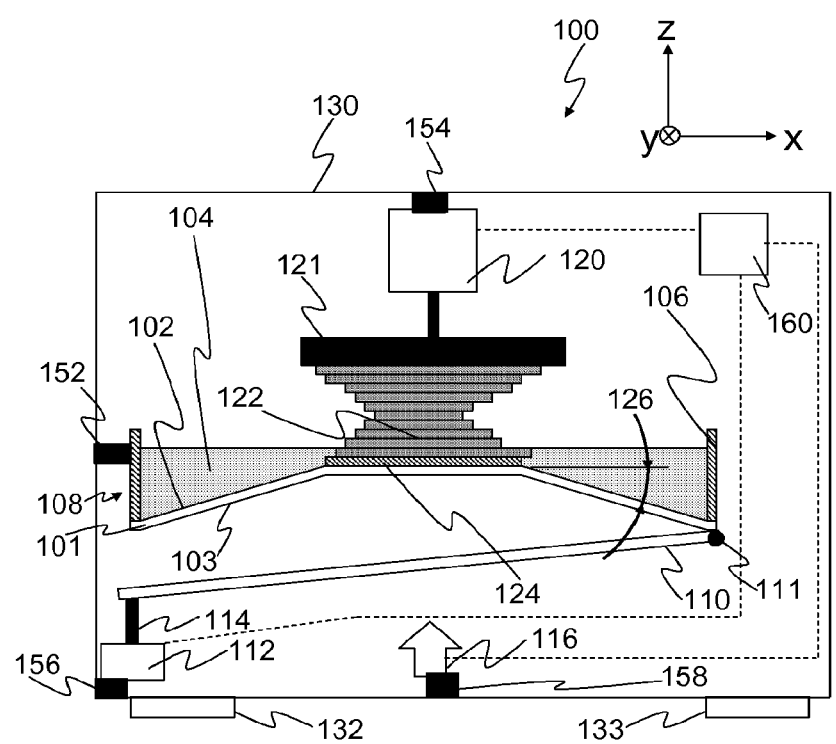
Figure 9:
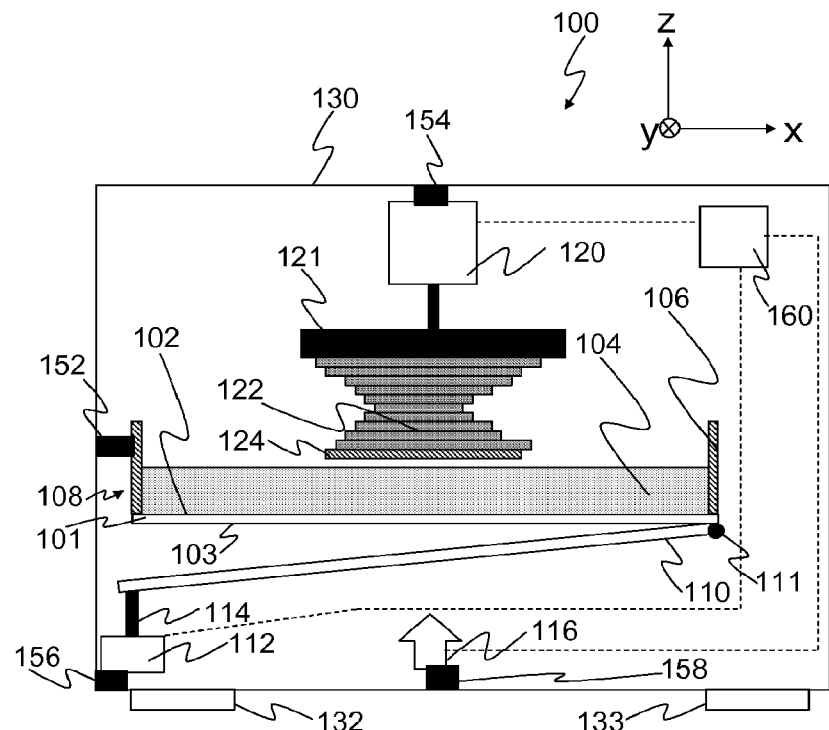

Next, as shown in FIG. 8, mechanical actuator 120 is engaged to raise the previously formed sections 122 and newly formed section 124, causing the sheet 101 to stretch and distort. Once the peeling angle 126 is sufficiently large the sheet will peel away from the newly formed section 124 and the apparatus 100 is ready for the process to start again, as shown in FIG. 9.

In other embodiments, the member may be configured such that the sheet is caused to adopt a configuration other than a flat configuration. This changes the distribution of the liquid material accordingly so that the spatial configuration of the liquid material between the sheet and the object is changed or modified to the desired shape. For example, a curved sheet configuration may be advantageous if the object being made has a rounded shape or if the light source 116 projects light 118 to a curved focal plane. The member may, in this case, have a bowl-like shape for example.

Alternatively, the sheet may be shaped or configured so that its upper surface has a desired configuration while maintaining a flat lower surface configuration against which the member may contact. Thus, as the section of the object is formed, the lower surface of the object section takes on the same configuration as the upper surface of the sheet. It will be understood that the configuration of the upper surface of the sheet may be any suitable desired geometrical arrangement.

The sheet may sag because of the weight of the material and the sheet itself. The amount of sheet sag may, in some circumstances, be too great to satisfy the required fabrication tolerances. The member, in some embodiments, supports part or all of the area of the sheet presented for radiation exposure to prevent sagging.

In the embodiments of FIGS. 1 to 9, for example, the fluid contained in the trough flows over the surface under the influence of gravity, causing the fluid to be disposed on the surface. Alternatively, the fluid may be periodically applied over the surface from a nozzle, or applied with a wiping action similar to the action of a windscreen wiper blade. In these cases, very small volumes of fluid, for example 0.1 ml to 10 ml, may be periodically applied, possibly reducing material wastage.

The member may comprise a plate of material transparent to the light from light source 116. It may, for example, be fabricated from fused silica when light of wavelength 405 nm is used. Alternatively, the plate may be fabricated from poly(methyl methacrylate) (PMMA), polycarbonate, soda-lime glass or any other suitable material that is sufficiently transparent to the particular actinic light used.

FIGS. 13 to 19 show representations of another embodiment of a device for making an object. The stages of one cycle of operation of the device are shown sequentially in the figures. Parts similar to those in FIGS. 1 to 9 are similarly numbered. In this embodiment, the tilting of the member is passively implemented, without active control.

Figure 13:
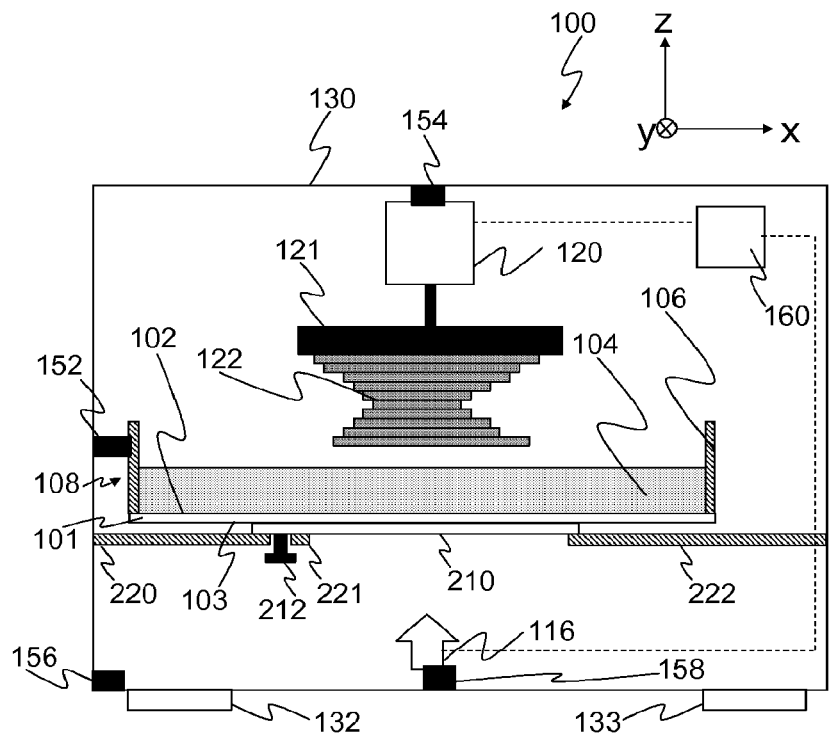
FIGS. 13 to 19 show schematic elevation views of another embodiment of an apparatus for making an object during the various stages of its use.
Figure 16:
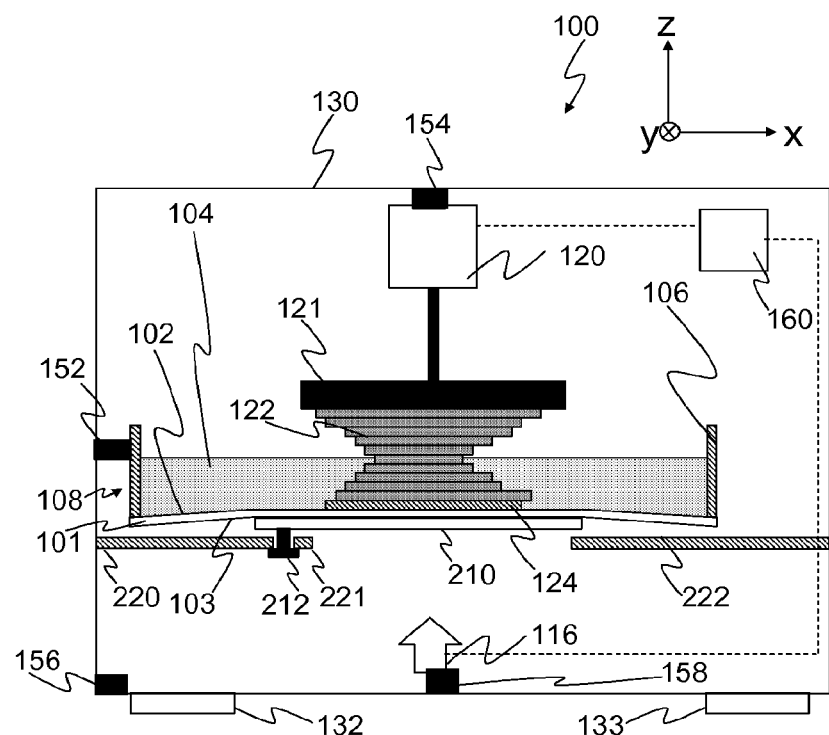

In FIG. 13, the member 210, in this embodiment, rests on a member platform 220,221,222 over an aperture formed therein for the passage of radiation from the radiation source 116. A left hand side of the member 210, as seen in FIG. 16, is pivotally attached to a left hand side of the platform by a constraint in the form of a pin 212, although, any suitable constraint such as a loop of metal, a hinge or the like may be used. The right hand side of the member is free. The sheet 101 is in a flat form or configuration resting on the member 210.

Figure 14:
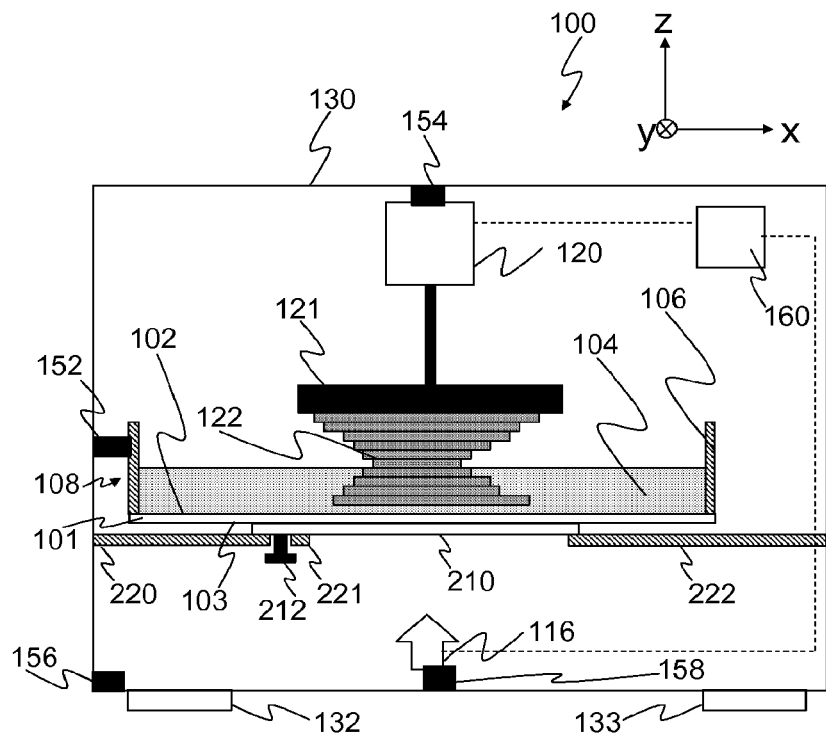
Figure 15:
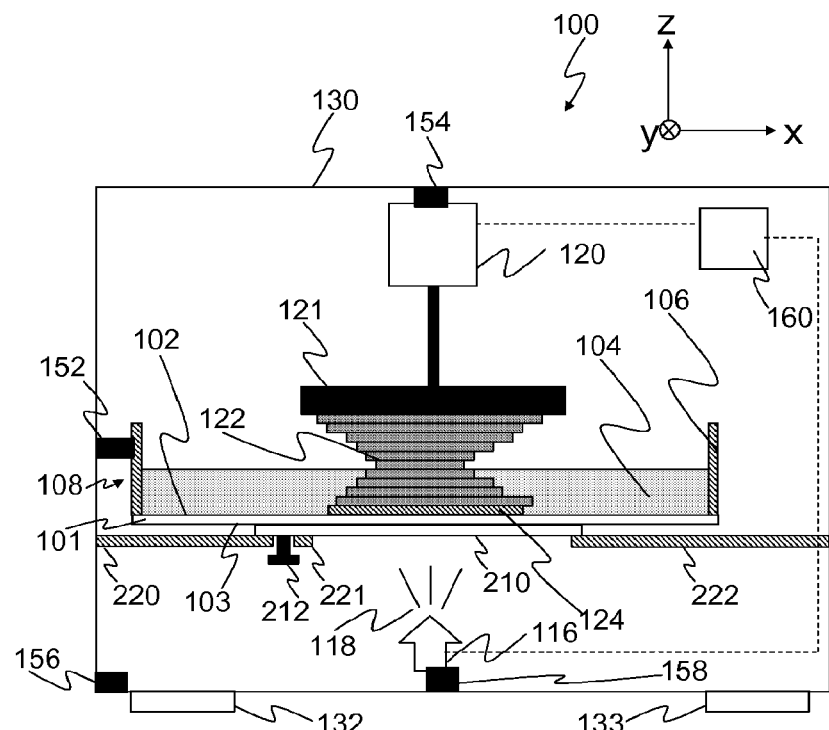

FIG. 14 shows the apparatus after the positioner 120 has moved the last formed section of the object to within one section thickness of the material receiving surface 102. Because the sheet is supported it does not distort when the object is brought into proximity. FIG. 15 shows irradiation of a layer of liquid with a light 118 to form a section 124.

Figure 17:
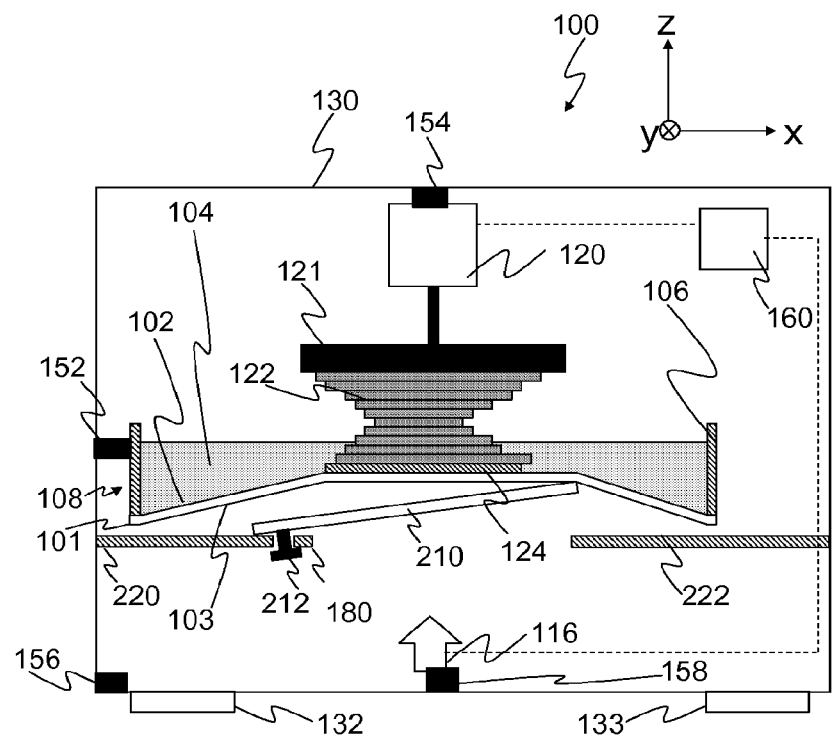
Figure 18:
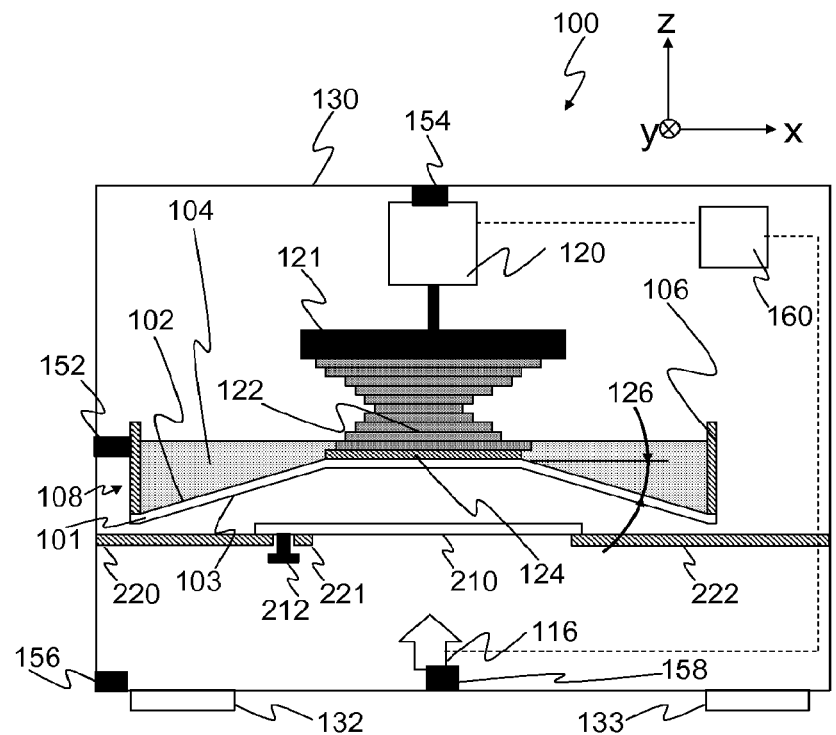
Figure 19:
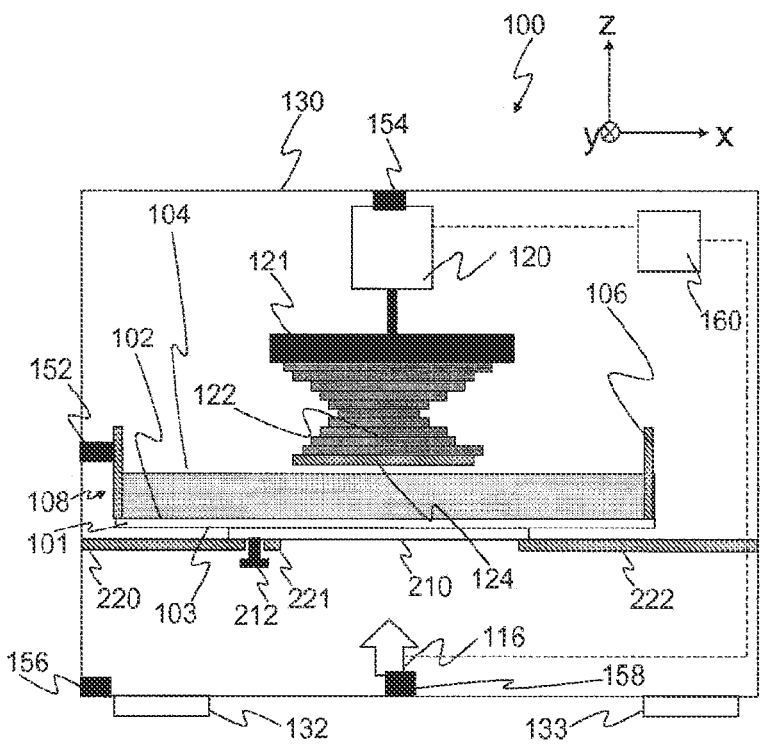

When the positioner lifts the object being made, atmospheric pressure causes the sheet and member to lift. At a point during lifting as shown in FIG. 16, the head of the pin engages the stage causing the member to tilt. The tilting of the member and subsequent peeling separation of the member from the sheet is shown in FIG. 17. The member then falls back to rest on the stage. Once the underside of the sheet is free of the member and exposed to the atmosphere, peeling separation between the object being made and the sheet may occur. As shown in FIG. 19, after peeling, the sheet falls to comes to rest in a flat form on the member ready for the cycle to be repeated.

Figure 20:
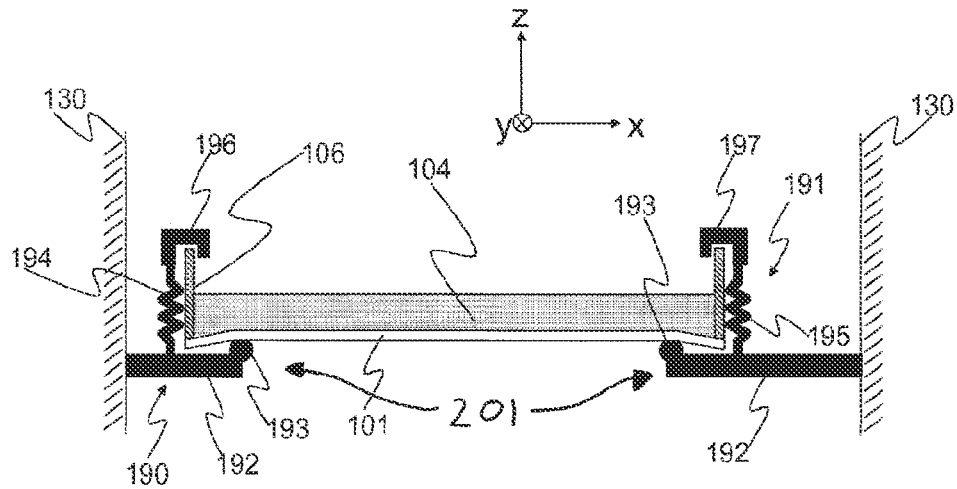
FIG. 20 shows an example of a tensioner that may be incorporated into an apparatus for making an object.

FIG. 20 shows a representation of an example tensioner, opposite sides of which are indicated by numerals 190,191. The tensioner may be incorporated into a device for making an object, such as, but not limited to, any one of the embodiments described and/or illustrated. The tensioner may be used to tension the sheet 101, keeping it taut. The tensioner is mounted to the chassis of the apparatus 130. The tensioner includes a frame 192 and a flexible element contacting component 193 in the form of a ring attached to the frame. The flexible element contacting component is, in use, in contact with the downwardly facing surface of the flexible element 101. The flexible element contacting component 193 may have any suitable form, such as square or oval. The parts of the flexible element contacting component 193 may not have sharp edges and corners to prevent puncture or localized yielding of the sheet 101. The tensioner may comprise one or more biasing elements that bias the flexible element contacting component towards the downwardly facing surface of the sheet 101. The one or more biasing elements may comprise a spring arrangement having extension springs 194,195, for example, operationally coupled to the sheet and the component. In other embodiments, the biasing members may comprise rubber, extension springs, leaf springs, or any other suitable biasing means. A hook or grip 196,197 at one end of the spring 194,195 is hooked over the side wall 106 of the trough or dish. The other end is attached, hooked or tethered, to the frame. When so placed, the spring, in this but not necessarily all embodiments, is in tension. The biasing elements may, alternatively or additionally, comprise electromechanical elements, such as a motor, or magnets (either electromagnets or permanent magnets). The downwardly facing surface is also biased into the frame, in this but not necessarily all embodiments, by gravity. The tensioner may not, in all circumstances, be sufficient, however, to prevent sag of the sheet 101 under gravity. A member as described above, such as 110, may assist in ameliorating any sag.

The tensioner may alternatively comprise one or more biasing elements between the sheet 101 and the side wall 106 of the trough or dish. In this but not necessarily in all embodiments, the tensioner pulls the perimeter of the sheet outwardly thereby maintaining tension, in both the x and y directions.

The tensioner may prevent the sheet, if not otherwise tensioned, from interfering with the moving member. The tensioner may prevent the sheet from creasing or being ripped by the moving member.

The vessel 108 may be removed by removing the hooks or grips 196,197 and then separated from the remainder of the apparatus. A new vessel may then be inserted and the hooks or grips engaged with the new vessel.

Figure 21:
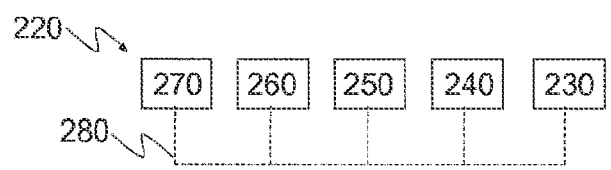
FIG. 21 shows an example architecture of a controller that may control an apparatus for making an object.

In some embodiments, such as that in FIGS. 1 to 9, the actuator for the member 112, the positioner 120, the light source 116, and possibly other parts of the apparatus, may be in communication with and may be controlled by a controller 160 to coordinate the machine to make the object. These and other components may be connected by wires, cables, wireless, or any other suitable means. In this embodiment, the controller may have a processor unit 220, schematically illustrated in FIG. 21. The processor unit 220 may include a suitable logic device 250 such as, or similar to, the INTEL PENTIUM or a suitably configured field programmable gate array (FPGA), connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LAB VIEW software together with associated hardware recommended by the commercial interface provider installed on the processor unit 220, over USB or RS-232 or TCP/IP links, for example. Alternatively, custom driver software, may be written for improved performance together with custom printed circuit boards. Alternatively, the processor unit 160 may comprise an embedded system.

In this embodiment, the controller 160 is in communication with another processor which is adapted for determining instructions and/or information for the apparatus. In alternative embodiments, the processors are the same processor. An example of another processing unit comprises a logic device such as, or similar to, the INTEL PENTIUM or a suitably configured field programmable gate array (FPGA), connected over a bus to a random access memory of around 100 Mb and a non-volatile memory of such as a hard disk drive or solid state non-volatile memory having a capacity of around 1 Gb. Generally, the configuration may be similar or identical to that shown in FIG. 21. The processor has a receiver such as a USB port (or Internet connection, for example) for receiving information representing an object, stored on a USB FLASH device, for example. The information may be encoded in a file generated by a Computer Aided Design (CAD) program, the information specifying the geometry of the object. The logic device runs a decomposer program implementing an algorithm that decomposes (or transforms) the information into data indicative of a plurality of sections to be formed sequentially by the device. The program may have been installed onto the processor from tangible media such as a DVD or USB memory stick, for example, that stored the program. In an alternative embodiment, the decomposer may be a dedicated hardware unit. A series of sections through the object are determined. The sections may then be further processed to represent the geometry of each section as a rasterised bitmap. The sections or bit maps may then be sent to controller 160 to control the device.

Now that embodiments of have been described, it will be appreciated that some embodiments may have some of the following advantages:

the flexible element may distort when the section and flexible element are separated, causing the flexible element to peel away from the section, in which case the object being formed experiences reduced forces than that generated when separating the section from the flexible element by other ways, consequently the risk of damage to the section and/or the object being made is reduced;

having the fluid disposed over the surface requires a relatively modest volume of fluid, reducing costly waste;

the member supporting the flexible element ameliorates sagging of the flexible element under the force of gravity, thereby improving the flatness and uniformity of the sections and reducing distortions in the object;

tilting the member away from the flexible element causes a relatively low-force peeling action that separates the member from the element, exposing the downward side of the flexible element to atmosphere. This allows the flexible element to distort freely and facilitate peeling of the layer, whereas air pressure may otherwise prevent free distortion of the flexible element if the member remains beneath the flexible element (a vacuum may be between them).

It will be appreciated that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

What is claimed is:

1. An apparatus for making an object, the apparatus comprising:
 a vessel for a material from which an object is made, the vessel comprising a flexible element having a material receiving surface for receiving the material from which the object is made; and
 a flexible element shaping member that is a material hardening radiation window and which is arranged to contact the flexible element and disposed between the flexible element and a flexible element shaping member supporting platform to which it is attached by a constraint, the shape of the flexible element being affected when the flexible element shaping member contacts the flexible element, the flexible element shaping member is pivotably attached by the constraint and cooperatively arranged with the constraint to pivot away from the flexible element to induce a separation of the flexible element shaping member from the flexible element;

wherein the flexible element is configured to be moved with the shaping member pressed thereto by atmospheric pressure, and the constraint constrains the movement of the flexible element shaping member such that the flexible element shaping member is caused to pivot away from the flexible element.

2. The apparatus defined by claim 1 configured such that in use the material receiving surface is upwardly facing and the flexible element shaping member contacts a downwardly facing surface of the flexible element directly beneath the object being made to prevent the element sagging.

3. The apparatus defined by claim 1, wherein at least one of the flexible element shaping member and the flexible element is configured to be tilted into contact with the other.

4. The apparatus defined by claim 1, wherein the flexible element shaping member is a flexible element flattening member.

5. The apparatus defined by claim 1, further comprising a radiation source arranged to irradiate the material so received through the flexible element shaping member and the flexible element to form a section of the object.

6. The apparatus defined by claim 1, further comprising a radiation source arranged to irradiate the material so received to form a section of the object, the radiation source being arranged to irradiate the material when the object being made is in contact with the material.

7. The apparatus defined by claim 1, wherein the flexible element comprises a flexible sheet.

8. The apparatus defined by claim 1, further comprising a flexible element tensioner.

9. The apparatus defined by claim 1, further comprising a controller configured to receive instructions for making the object.

\* \* \* \* \*